(12) United States Patent
Freeman et al.

(10) Patent No.: US 10,321,778 B2
(45) Date of Patent: Jun. 18, 2019

(54) ADJUSTABLE DISH CADDY

(71) Applicant: Cambro Manufacturing, Huntington Beach, CA (US)

(72) Inventors: Ernest F. Freeman, Garden Grove, CA (US); Abraham Ruiz, Anaheim, CA (US)

(73) Assignee: Cambro Manufacturing Company, Huntington Beach, CA (US)

( * ) Notice: Subject to any disclaimer, the term of this patent is extended or adjusted under 35 U.S.C. 154(b) by 77 days.

(21) Appl. No.: 15/612,757

(22) Filed: Jun. 2, 2017

(65) Prior Publication Data

US 2018/0344062 A1 Dec. 6, 2018

(51) Int. Cl.
*A47G 19/08* (2006.01)
*B62B 3/02* (2006.01)
*B65D 25/06* (2006.01)

(52) U.S. Cl.
CPC ............ *A47G 19/08* (2013.01); *B62B 3/02* (2013.01); *B65D 25/06* (2013.01)

(58) Field of Classification Search
CPC ........... A47G 19/08; B62B 3/02; B65D 25/06
USPC ................................................ 211/41.1, 41.2
See application file for complete search history.

(56) References Cited

U.S. PATENT DOCUMENTS

| | | | | |
|---|---|---|---|---|
| 420,761 A | * | 2/1890 | Bettendorf | A47F 7/04 211/24 |
| 1,518,216 A | * | 12/1924 | Onody | A47L 19/00 211/41.11 |
| 1,660,210 A | * | 2/1928 | Schaefer | A47F 7/0064 211/41.2 |
| 1,874,367 A | * | 8/1932 | Seyl | B42F 17/02 220/547 |
| 1,937,098 A | * | 11/1933 | Seyl | B42F 17/02 220/540 |
| 2,340,595 A | * | 2/1944 | Jones | B65H 49/38 220/8 |
| 2,454,516 A | * | 11/1948 | Laureyns | A47J 47/16 211/40 |
| D167,203 S | * | 7/1952 | Grode | 211/41.2 |
| 2,616,567 A | * | 11/1952 | McCulloch | A47L 19/00 211/41.2 |
| 2,620,928 A | * | 12/1952 | Brooks | A47J 47/16 211/41.2 |

(Continued)

FOREIGN PATENT DOCUMENTS

| | | | | |
|---|---|---|---|---|
| DE | 9417521 U1 | * | 1/1995 | ............ B65D 25/06 |
| DE | 4438981 A1 | * | 5/1996 | ............ B42F 17/16 |
| WO | 2011/160911 | | 5/2011 | |

*Primary Examiner* — Michael Safavi
(74) *Attorney, Agent, or Firm* — Marcus C. Dawes

(57) ABSTRACT

An adjustable dish caddy comprising a plurality of partitions that are removably coupled to a base. The relative position of each partition within the caddy is adjusted by the user rotating a cam lever disposed in the top portion of each partition. Rotating the cam lever in turn pushes a cam shaft downwards through the partition which moves a spacer away from and off of the bottom surface of the base. With the spacer moved off of the bottom surface of the base, the user then moves or slides the partition to a new desired position along a pathway it is disposed in. The cam lever is then rotated back downward against the partition which reestablishes contact between the base and the partition, thereby locking the partition into its new position.

33 Claims, 12 Drawing Sheets

(56) References Cited

U.S. PATENT DOCUMENTS

| | | | | |
|---|---|---|---|---|
| 2,842,269 A * | 7/1958 | Gomersall | ............ | A47J 39/006 |
| | | | | 211/184 |
| 3,173,546 A * | 3/1965 | Vershbow | ............... | A47B 31/00 |
| | | | | 211/41.2 |
| 3,370,591 A * | 2/1968 | Coe | ......................... | B42F 17/02 |
| | | | | 220/540 |
| 4,123,128 A * | 10/1978 | Abele | ...................... | A21B 3/13 |
| | | | | 211/135 |
| 4,156,498 A * | 5/1979 | Miller | .................... | B44D 3/185 |
| | | | | 206/451 |
| 4,592,471 A * | 6/1986 | Bross | ...................... | A47J 47/16 |
| | | | | 108/61 |
| 4,884,714 A | 12/1989 | Bechtel | | |
| 5,217,121 A * | 6/1993 | Walker | .................... | B65G 1/14 |
| | | | | 211/41.1 |
| 5,318,190 A * | 6/1994 | Mason | .................. | A47F 7/0064 |
| | | | | 211/175 |
| 6,648,572 B2 * | 11/2003 | Piazza | ...................... | B65G 1/14 |
| | | | | 211/162 |
| 7,104,409 B2 * | 9/2006 | Morgan | .................... | A47F 5/01 |
| | | | | 211/41.1 |
| 7,988,107 B2 | 8/2011 | Miller | | |
| 8,511,484 B1 | 8/2013 | Greenberg | | |
| 2003/0132176 A1 * | 7/2003 | Takano | ............. | H01L 21/67309 |
| | | | | 211/41.1 |
| 2012/0193310 A1 * | 8/2012 | Fluhrer | .................. | F24J 2/5203 |
| | | | | 211/41.1 |
| 2014/0305888 A1 | 10/2014 | Nales | | |
| 2017/0137177 A1 * | 5/2017 | Prezecki, II | ........... | B65D 25/06 |

* cited by examiner

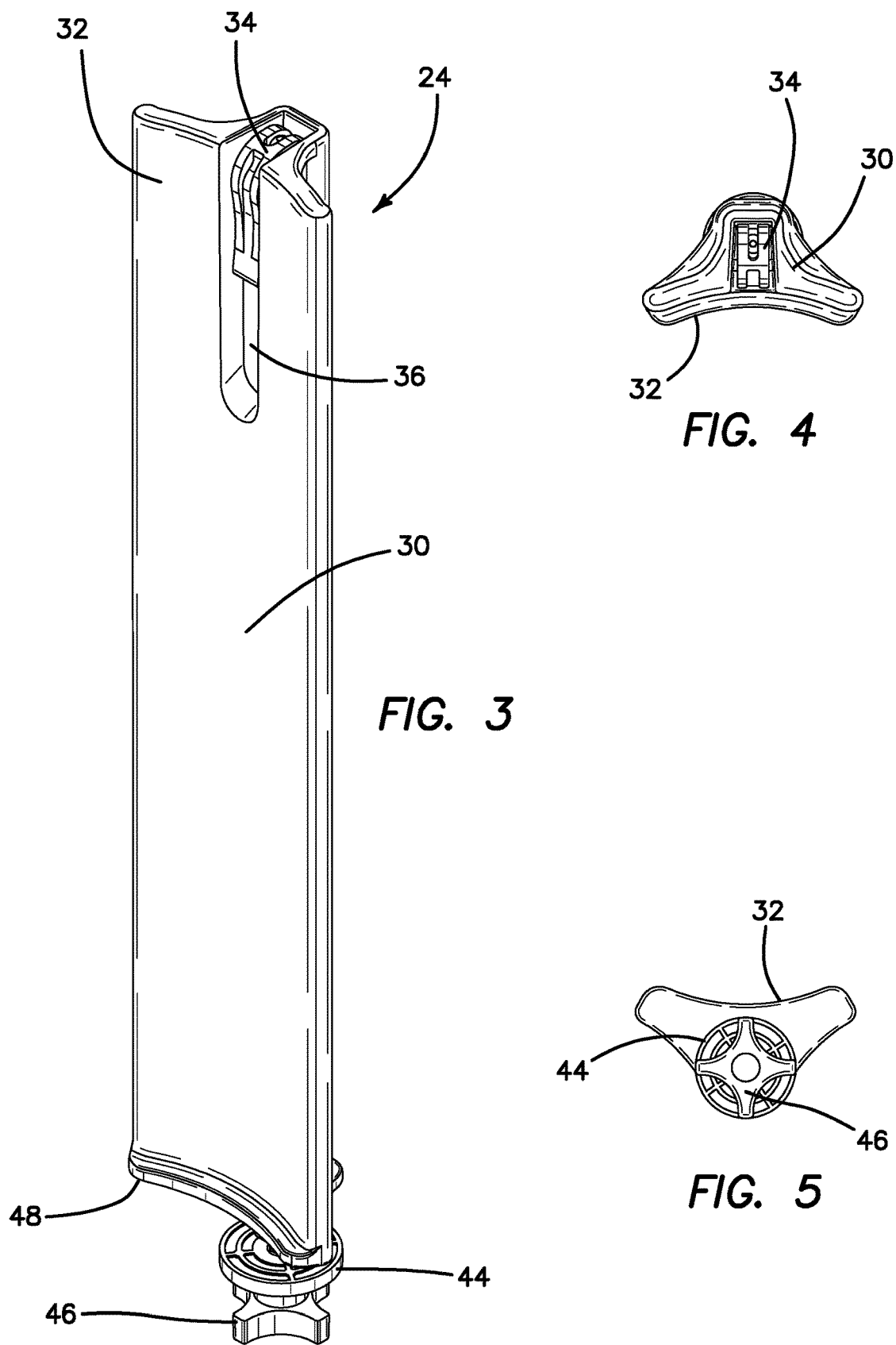

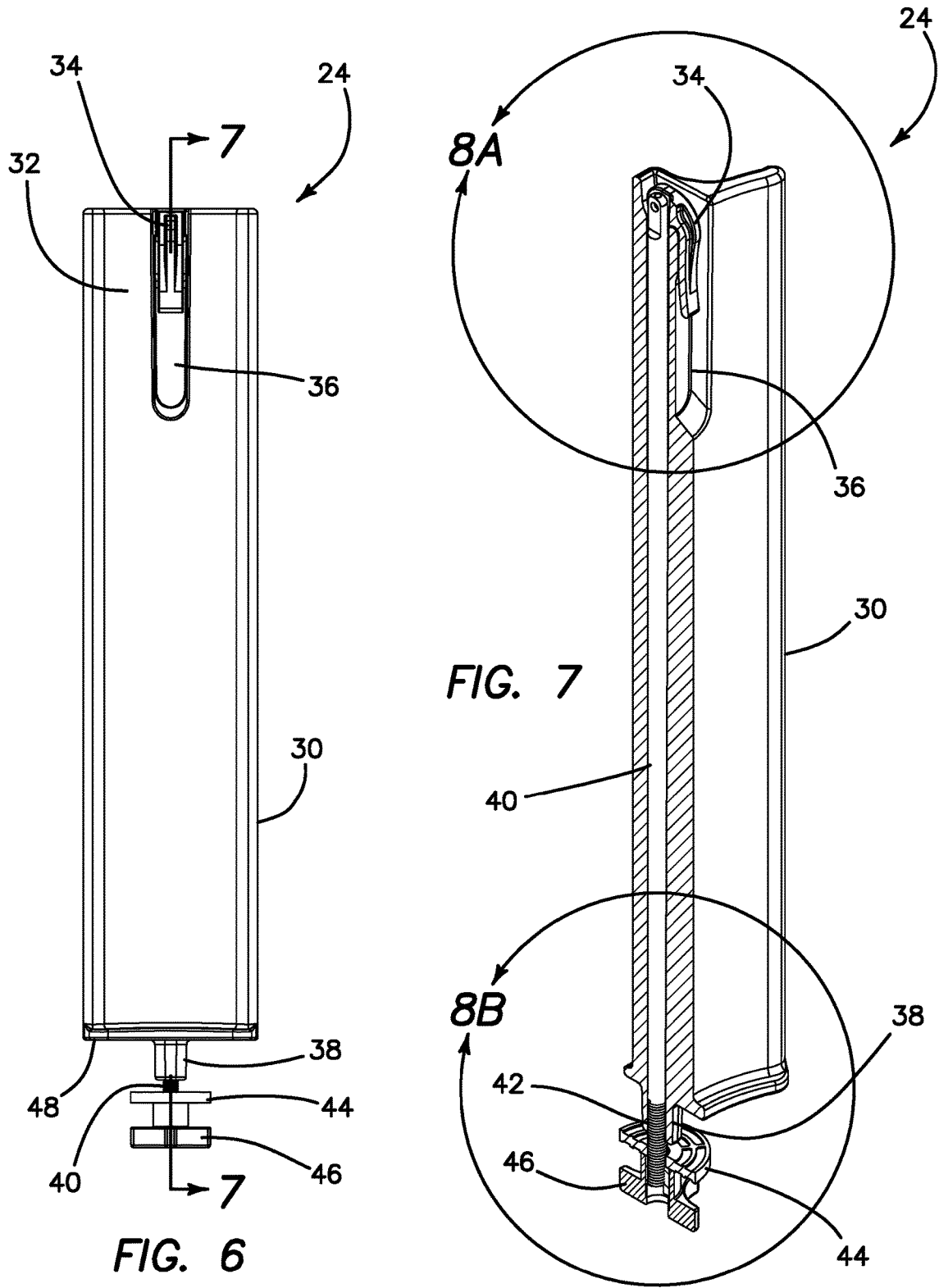

ADJUSTABLE DISH CADDY

BACKGROUND

Field of the Technology

The invention relates to the field of dishware and dishware accessories, namely an adjustable dish caddy for accommodating and storing a plurality of dishes of varying sizes.

Description of the Prior Art

Ever since dishware such as plates, bowls, serving platters, cups, and the like have been in widespread use, there has been a need to store, accommodate, or otherwise transport them from one location to another. This particular need is especially acute for individuals or organizations who regularly work with large quantities of dishware items such as restaurants, cafeterias, and catering companies. Traditionally, many of these entities use dish racks or crates in which users stack or otherwise place dishware items into the rack or crate and then it carry by hand to another location. Some dish racks or crates are in a tower configuration with multiple shelves or compartments and may comprise a number of wheels or casters to facilitate the easy transport of a large number of racks at once. A specific problem arises however when several types of dishware items must be stored or transported within the same dish rack. For example, a dish rack may be sized or configured to store a plurality of 8 inch diameter plates only, thus making it unsuitable or unusable for accommodating larger 16 inch diameter plates. A user may still attempt to stack dishware into an ill-fitting dish rack, however the odds of the dishware toppling over or breaking, especially when being transported, increases dramatically. Alternatively, the user may use two different dish racks or crates with each rack or crate being dedicated to one specific dishware item. Having multiple sets of dishware racks can be costly however and can also be inconvenient for catering companies for whom storage space is at a premium.

One specific solution used in the prior art is an adjustable dish rack or caddy which may accommodate a plurality of different sized dishware items at the same time. Specifically, the adjustable caddy typically includes a flat surface in which to stack dishware items that is segmented by a number of towers and a corresponding number of side walls. The user places the dishware items between the side walls and the towers, stacking or nesting the items as additional items are placed into the caddy. However, in order to adjust the caddy, the user must first empty the caddy, invert the caddy and expose its bottom surface, adjust or remove a removable fixture on the bottom surface, and then flip the caddy back to its original position before replacing the dishware.

In U.S. Pat. No. 4,611,718, a device for storing a plurality of dishes is disclosed where the device comprises a number of divider panels which assists in storing the dishes in a stacked configuration. Each divider panel is removably mounted with respect to a base, however each divider panel must be mounted to the base in one of three different pre-determined positions. Additionally, each divider panel cannot be removed by a means located in a top portion of the panel itself.

U.S. Pat. No. 4,957,206 likewise discloses a device which stores a plurality of dishes in a series of stacks via a base and a plurality of partitions. The device may be adjusted or configured to accommodate a specific number of dish stacks by mixing and matching different types of partitions, namely cross-shaped partitions, T-shaped partitions, and corner partitions. However none of the different varieties of partitions may be freely removed or readjusted from a top portion of the partition itself.

What is needed therefore is an adjustable dish caddy that is easy and simple to adjust without having to be inverted while also being capable of accommodating a plurality of differently sized dishware items simultaneously. The dish caddy should also be easy to disassemble so that each part may be thoroughly cleaned.

BRIEF SUMMARY

The current invention includes an adjustable apparatus for accommodating a plurality of different sized dishware items. The apparatus includes a base which has a first plurality of pathways and a second plurality of pathways defined within it. The second plurality of pathways are defined at an orientation that is different than the first plurality of pathways. The apparatus also includes a plurality of partitions that are removably inserted into either the first or second plurality of pathways. Each of the plurality of partitions in turn includes means for adjusting the relative position of the partition within its respective pathway disposed in a top portion of the partition.

In one embodiment, the means disposed in a top portion of the partition for adjusting the relative position of the partition includes a cam and lever that is configured to adjust the relative position of the partition within its respective pathway. Specifically, a cam shaft is disposed throughout the height of the partition. The cam shaft comprises a distal threaded end and a proximal end located at a top portion of the partition which is also coupled to the cam lever. A spacer is disposed on the cam shaft along with an adjustable knob that is threadably coupled to the distal threaded portion of the cam shaft.

In one particular embodiment the plurality of partitions each comprise a peg disposed on its bottom surface, the peg being capable of being inserted into any of the first or second plurality of pathways. When the partition is placed within one of the plurality of pathways, the distal threaded end of the cam shaft protrudes from the peg while the bottom surface of the partition rests on a top surface of the base. The spacer and adjustable knob are coupled to the exposed portion of the distal threaded end of the cam shaft protruding from the peg, thereby disposing or sandwiching the base between the bottom surface of the partition and the spacer.

In another embodiment, each of the plurality of partitions comprises a body which in turn includes a curved frontal surface. In this particular embodiment, the cam means and lever and disposed in a finger recess that is defined within the curved frontal surface of the body of each of the plurality of partitions.

In yet another embodiment, the apparatus also includes a pair of end walls and a pair of mid-walls that are disposed about edges of the base. Specifically, the pair of end walls and the pair of mid-walls are each disposed on separate and opposing edges of the base. Each of the end walls is comprised of a pair of corner posts and a center post that is disposed between the corner posts. The first plurality of pathways are preferably defined between a center of the base and each of the corner posts within each of the end walls, while the second plurality of pathways are preferably defined between the center of the base and the pair of mid-walls and the pair of center posts within each of the end walls.

The invention further includes a method for adjusting a dish caddy. The method includes actuating a cam lever disposed in a top portion of a removable partition inserted into a pathway defined within a base, the base itself comprising a top surface and a bottom surface. The partition is then released from a first position within the pathway and slid along the length of the pathway to a second position. The partition is the fixed to the base at the second position within the pathway by moving the cam lever back into its original position.

In one embodiment, the method step of releasing the partition from a first position within the pathway includes lowering a cam shaft through a body of the partition, thus backing a spacer disposed on a distal end of the cam shaft off of the bottom surface of the base.

In a related embodiment, actuating the cam and lever disposed in a top portion of the removable partition in turn moves the cam shaft in the downward direction relative to the body of the partition.

In another embodiment, the method step of fixing the partition to the base at the second position within the pathway includes raising the cam shaft through the body of the partition and bringing the spacer disposed on the distal end of the cam shaft into contact with the bottom surface of the base.

In yet another embodiment, the method step of sliding the partition along the length of the pathway from the first position to the second position specifically includes sliding a peg disposed on a bottom surface of the partition within the pathway until reaching the second position.

In a separate embodiment, the method also includes removably coupling the partition to the base. Specifically, the partition is removably coupled to the base by first inserting a peg disposed on a bottom surface of the partition into one of a plurality of pathways defined within the base. Next, a distal portion of a cam shaft disposed through the height of the partition is exposed through the bottom surface of the base, allowing a spacer to be threaded thereon. Finally, an adjustable knob is coupled to the distal portion of the cam shaft and then rotated until the spacer is pressed against the bottom surface of the base. This embodiment further includes removing the partition from the base by first rotating the adjustable knob until the spacer backs off from the bottom surface of the base, thus allowing for the adjustable knob itself to be removed from the distal portion of the cam shaft. The spacer may next be removed from the distal portion of the cam shaft which allows the partition to be lifted upward and away from the top surface of the base while simultaneously removing the peg disposed on the bottom surface of the partition from within the pathway.

In a related embodiment, the method further provides for removably coupling a plurality of partitions to the base, each of the plurality of partitions being inserted into a corresponding plurality of pathways defined within the base. In one specific embodiment, the plurality of pathways are defined between a center of the base and a corresponding plurality of corner posts disposed on the base, while in a separate embodiment, the plurality of pathways are defined between a center of the base and a pair of mid-walls disposed on the base and a pair of center posts disposed on the base.

In a separate embodiment, the adjustable knob threadably coupled to the distal threaded portion of the cam shaft includes a plurality of weights.

In yet another embodiment, the means for adjusting the relative position of the partition within its respective pathway disposed in a top portion of the partition includes a latch which is rotatably mounted with respect to an inner seat within the partition. In this embodiment, the proximal end of the cam shaft includes a pull handle and a notch defined in its surface that is used to accommodate a wedge portion of the latch.

In a related embodiment, the means for adjusting the relative position of the partition within its respective pathway includes a release knob that is coupled to a handle seat within the partition. The release knob also includes a pin that is configured to enter and exit the cam shaft at the user's discretion. In this embodiment, the proximal end of the cam shaft includes a handle and also a notch that is defined in its surface. The notch is sufficiently sized and shaped to accommodate the pin of the release knob.

The release knob itself principally includes a release knob body, a pin cylinder that is disposed concentrically within the release knob body and coupled to the handle seat, and a spring that is disposed between at least one surface of the release knob body and at least one surface of the pin cylinder. Here, the pin is preferably disposed within the pin cylinder and is coupled to at least one surface of the release knob body, whereas the release knob body is itself slidably engaged with the pin cylinder. The handle seat of this embodiment also preferably includes a pin aperture that is defined through at least a portion of its cross sectional thickness, thereby allowing the pin to traverse between the pin cylinder and the cam shaft.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

BRIEF DESCRIPTION OF THE DRAWINGS

FIG. 3 is a perspective view of a partition element which is removably coupled to the adjustable dish caddy seen in FIG. 1.

FIG. 4 is a top down view of the partition element seen in FIG. 3.

FIG. 5 is a bottom plan view of the partition element seen in FIG. 3.

FIG. 6 is a frontal view of the partition element seen in FIG. 3.

FIG. 7 is a cross sectional view of the partition element taken along the lines 7-7 as seen in FIG. 6.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

Figure 1:
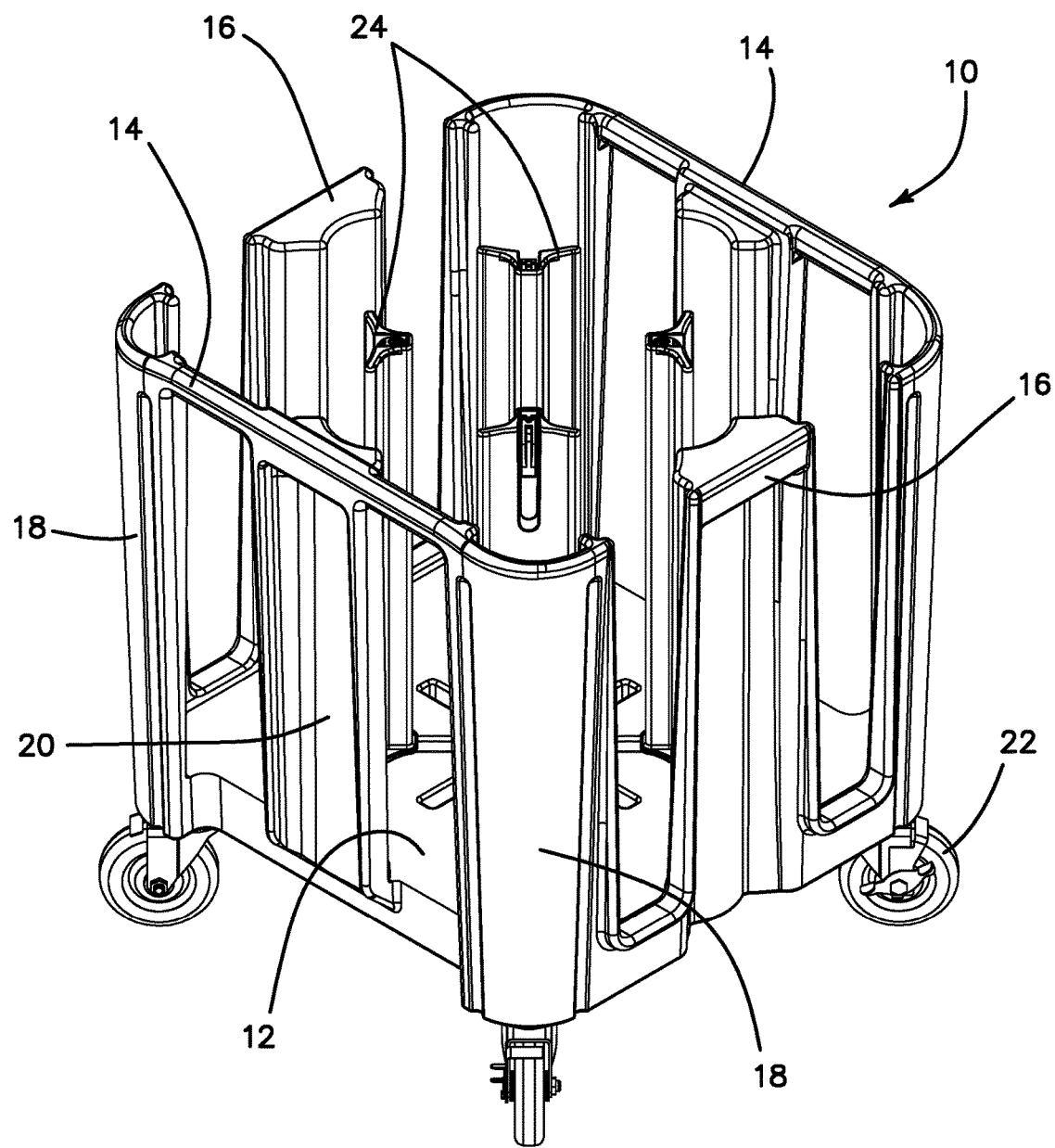
FIG. 1 is a perspective view of the adjustable dish caddy of the current invention.
Figure 2:
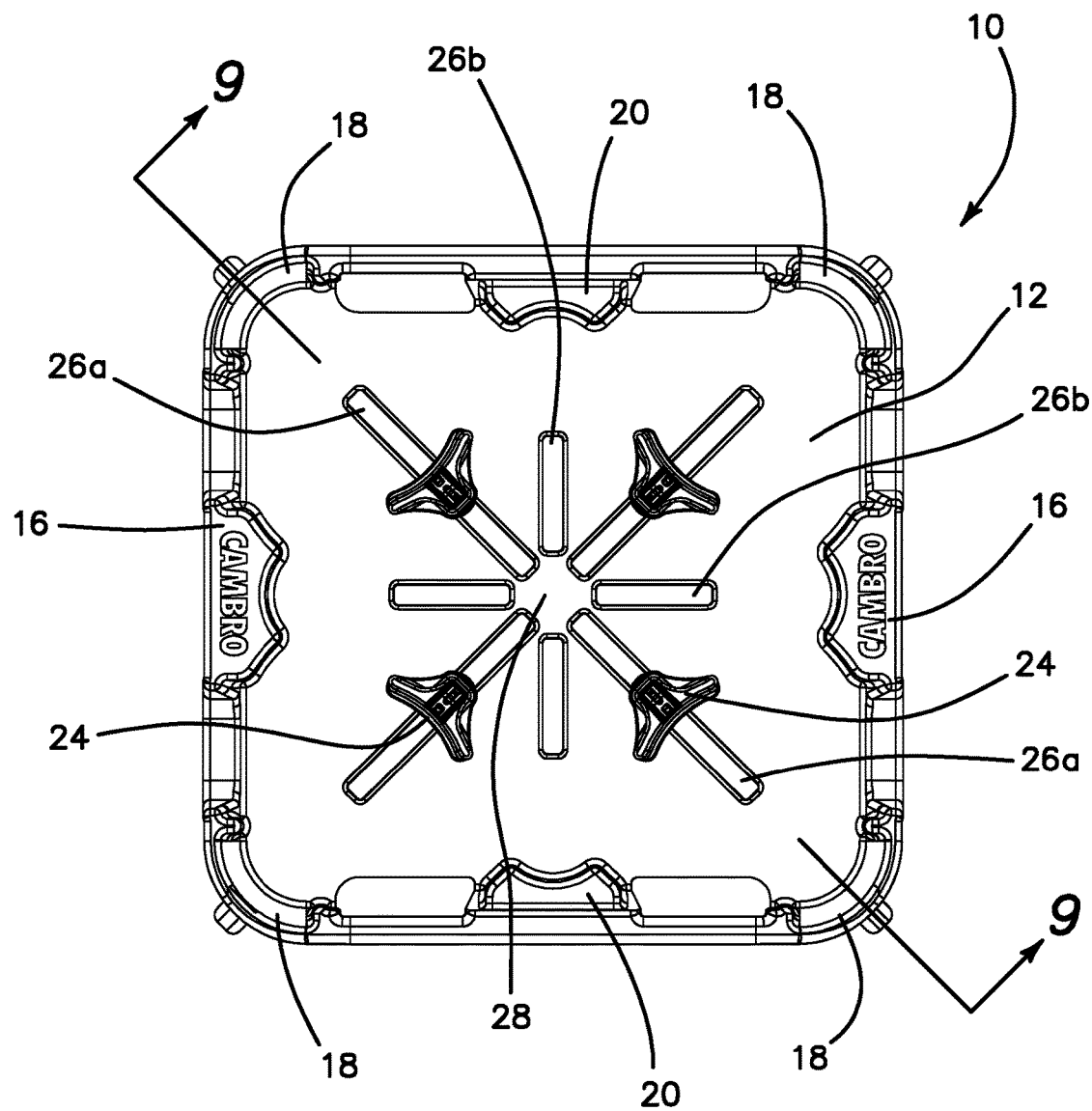
FIG. 2 is a top plan view of the adjustable dish caddy seen in FIG. 1.

The current invention is an adjustable dish caddy which is seen in FIG. 1 and is generally denoted by reference numeral 10. The dish caddy 10 comprises a base 12 that is substantially square shaped and comprises a pair of end walls or shells 14 disposed on two opposing sides of the base 12. Disposed between the end walls 14 on the two remaining adjacent edges or sides of the base 12 are a pair of mid-walls or panels 16, which, like the end walls 14, face each other at opposing positions across the base 12. Each end wall 14, as best seen in FIGS. 1 and 2, comprises a pair of vertical corner posts or portions 18 with a vertical center post or portion 20 disposed there between. The base 12, end walls 14, and mid-walls 16 are all preferably formed from a single piece of formed plastic or plastic composite. Also coupled to the base 12 are a plurality of wheels or casters 22 which allow the caddy 10 to be easily moved by pushing or pulling the caddy 10 accordingly.

The caddy 10 additionally comprises a plurality of vertically contoured brackets, columns, or partitions 24 that are removably coupled to the base 12. Specifically, as best seen in FIG. 2, each of the contoured partitions 24 are removably inserted or disposed through one of a plurality of slots, channels, or pathways 26a, 26b defined in the surface of the base 12. Each of the pathways 26a, 26b comprise one of two different orientations, specifically an angled or corner orientated pathway 26a or a straight or wall orientated pathway 26b. The angled or corner orientated pathways 26a are defined between a corner post or portion 18 and a center portion 28 of the base 12 in a substantially straight line. The straight or wall orientated pathways 26b are in turn defined between a mid-wall 16 and the center portion 28 of the base 12 in a substantially straight line. While the angled pathways 26a and the straight pathways 26b are shown FIG. 2 in a substantially "X" and "+" orientation, respectively, it should be noted that fewer or additional pathways 26a, 26b in various orientations not explicitly shown may also be used without departing from the original spirit and scope of the invention.

Greater detail of the contoured brackets or partitions 24 may be had by turning to FIGS. 3-8B. Each partition 24 comprises a substantially vertical orientated body 30. In one embodiment, the body 30 is substantially contoured or shaped along its entire height to provide a substantially concave or inwardly curved frontal surface 32 which can best be appreciated in FIG. 4. The partition 24 further comprises a cam lever 34 disposed within a recessed cam lever housing or finger recess 36 that is defined within a top portion of the curved frontal surface 32. In a separate embodiment, each partition 24 may comprise an alternative shape such as a cylinder, prism, or any other appropriate shape. Alternatively, the partition 24 may comprise multiple surfaces which may either be flat or rounded as long as the cam lever 34 remains recessed within the body 30 of the partition 24. Additionally, the cam lever 34 itself may comprise a shape other than what is explicitly shown, such as a pear shaped cam or a circular cam as is known in the art, without departing from the original spirit and scope of the invention.

As shown in FIGS. 6 and 7, disposed at a bottom portion of the body 30 is an extended portion or peg 38 which is substantially cylindrical in shape and is capable of being inserted into the pathways 26a, 26b defined within the base 12. As best seen in FIG. 6, a cam shaft 40 is threaded through the vertical height of the body 30 of the partition 24 with a distal end extending from the extended portion or peg 38. Coupled to the distal end of the cam shaft 40 is a washer or spacer 44 followed by a rotatable or adjustable knob 46.

Figure 8A:
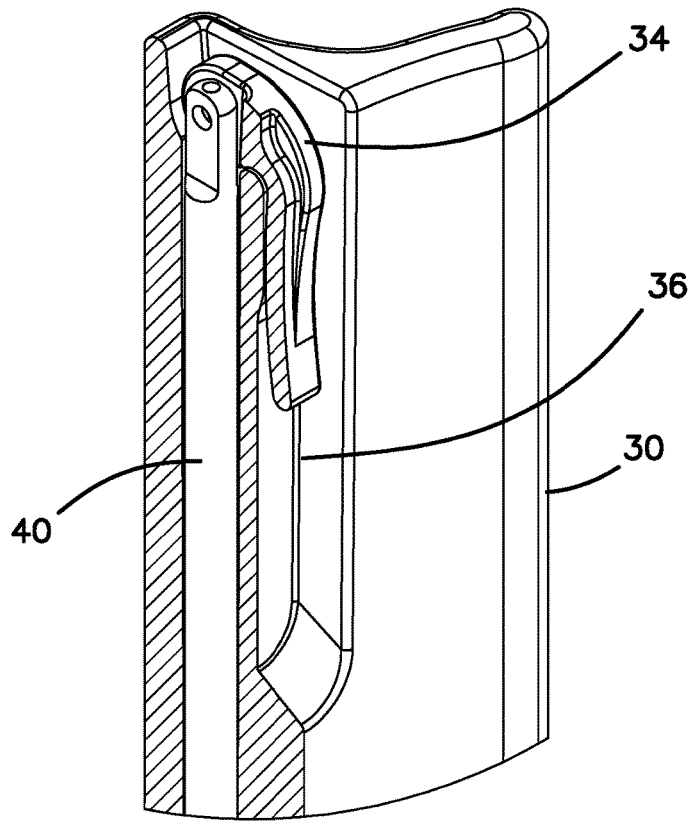
FIG. 8A is a magnified cross sectional view of the top portion of the partition element seen in FIG. 7.
Figure 8B:
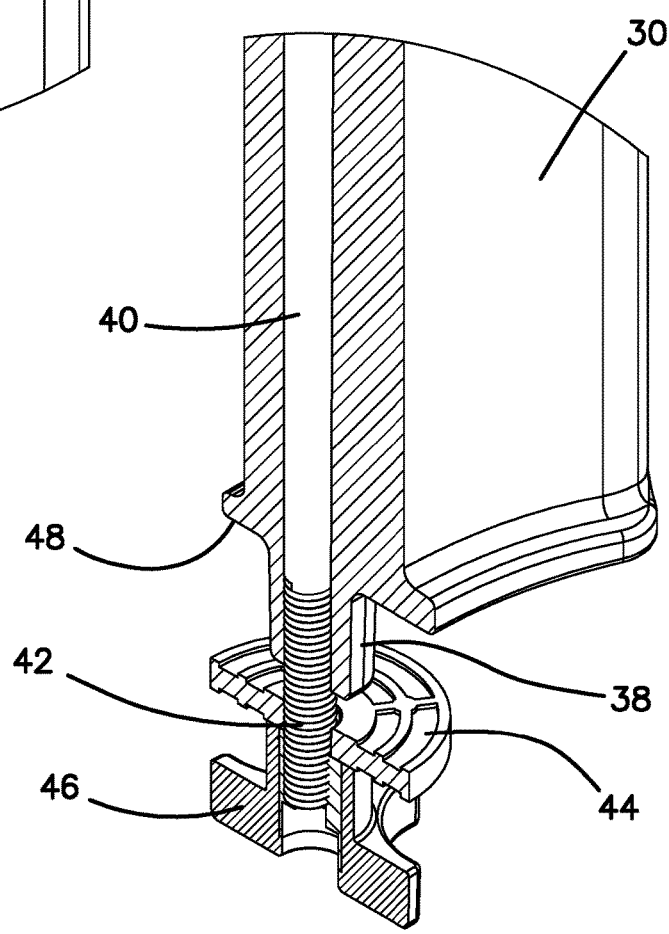
FIG. 8B is a magnified cross sectional view of the bottom portion of the partition element seen in FIG. 7.

FIGS. 7, 8A, and 8B show cross sectional views of the partition 24. As seen in FIG. 7, the cam shaft 40 is disposed through the entire vertical height of the body 30 with a proximal portion coupled to the cam lever 34 and a distal portion coupled to the washer or spacer 44 and knob 46. Specifically, the washer or spacer 44 and the adjustable knob 46 couple to the cam shaft 40 by interacting with the distal or bottom portion of the cam shaft 40 which comprises a threaded portion 42.

To couple or secure a partition 24 to the base 12 of the caddy 10, the partition 24 is placed over one of the plurality of corner orientated pathways 26a or one of the plurality of wall orientated pathways or channels 26b, depending upon the specific configuration or use of the caddy 10 desired by the user. The partition 24 is inserted into the selected corner orientated pathway 26a or wall orientated pathway 26b by inserting the peg 38 containing the threaded portion 42 of the cam shaft 40 through the opening of the pathway 26a, 26b until the threaded portion 42 protrudes or is exposed on the reverse or bottom surface of the base 12. The spacer 44 is coupled to the cam shaft 40 by sliding the threaded portion 42 through the aperture defined in the spacer 44. The adjustable knob 46 is then coupled to the cam shaft 40 by engaging the adjustable knob 46 with the threaded portion 42 and then rotating it until the spacer 44 is firmly in place and flush against the reverse or bottom surface of the base 12. With the adjustable knob 46 in place, the partition 24 is firmly locked into the desired position within the selected pathway 26a, 26b at the location where the user first inserted the peg 38 into the pathway 26a, 26b.

Figure 9:
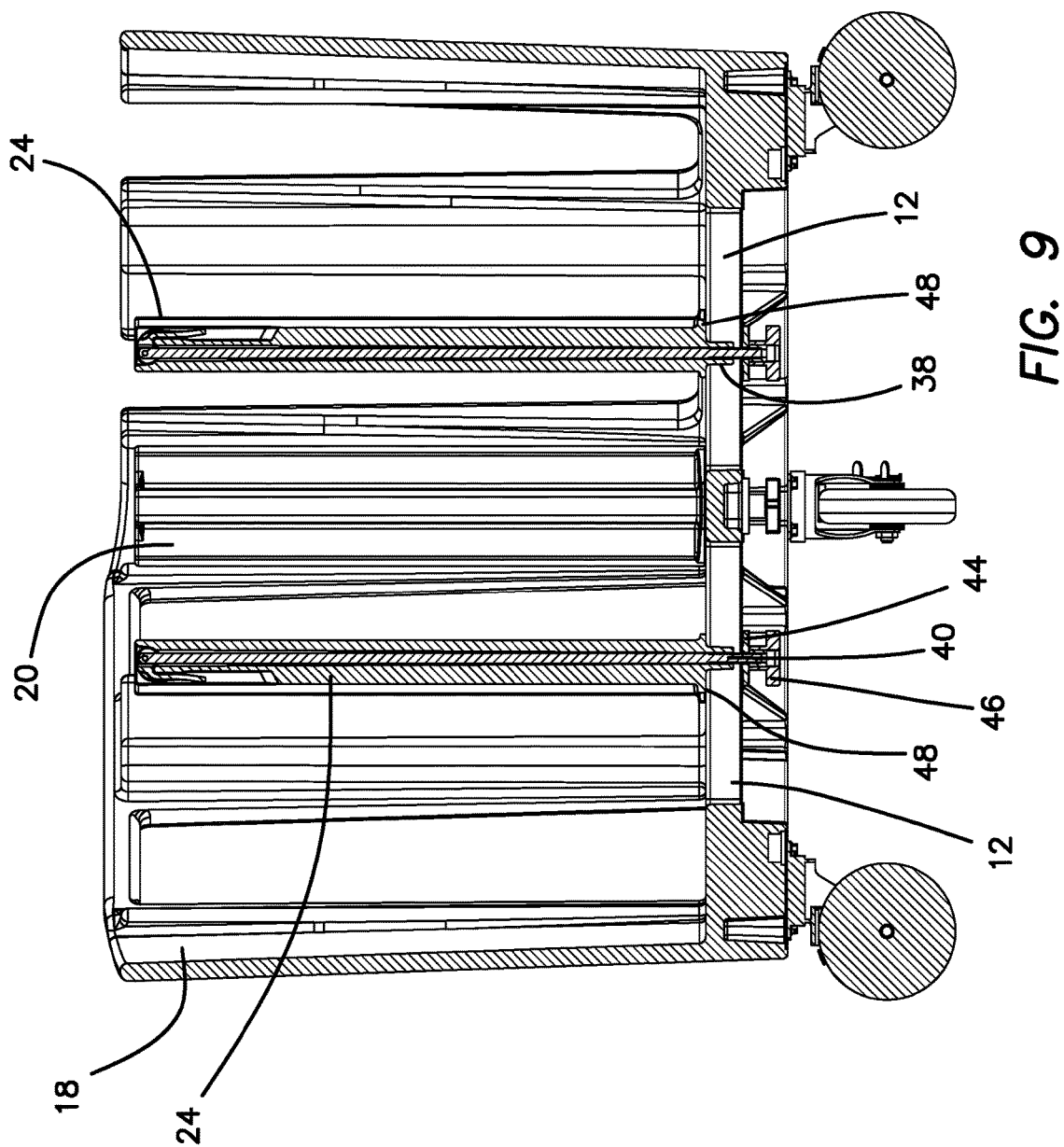
FIG. 9 is a partial cross sectional side view of the adjustable dish caddy seen in FIG. 1.

Additionally, as best seen in the cross sectional view of FIGS. 8B and 9, by rotating the adjustable knob 46 until the spacer 44 makes contact with the bottom surface of the base 12, the base 12 itself is locked or "sandwiched" in between the spacer 44 and a bottom surface 48 of the body 30 of the partition 24, thus keeping the partition 24 in a stationary position regardless of the relative movement of the caddy 10.

Figure 10:
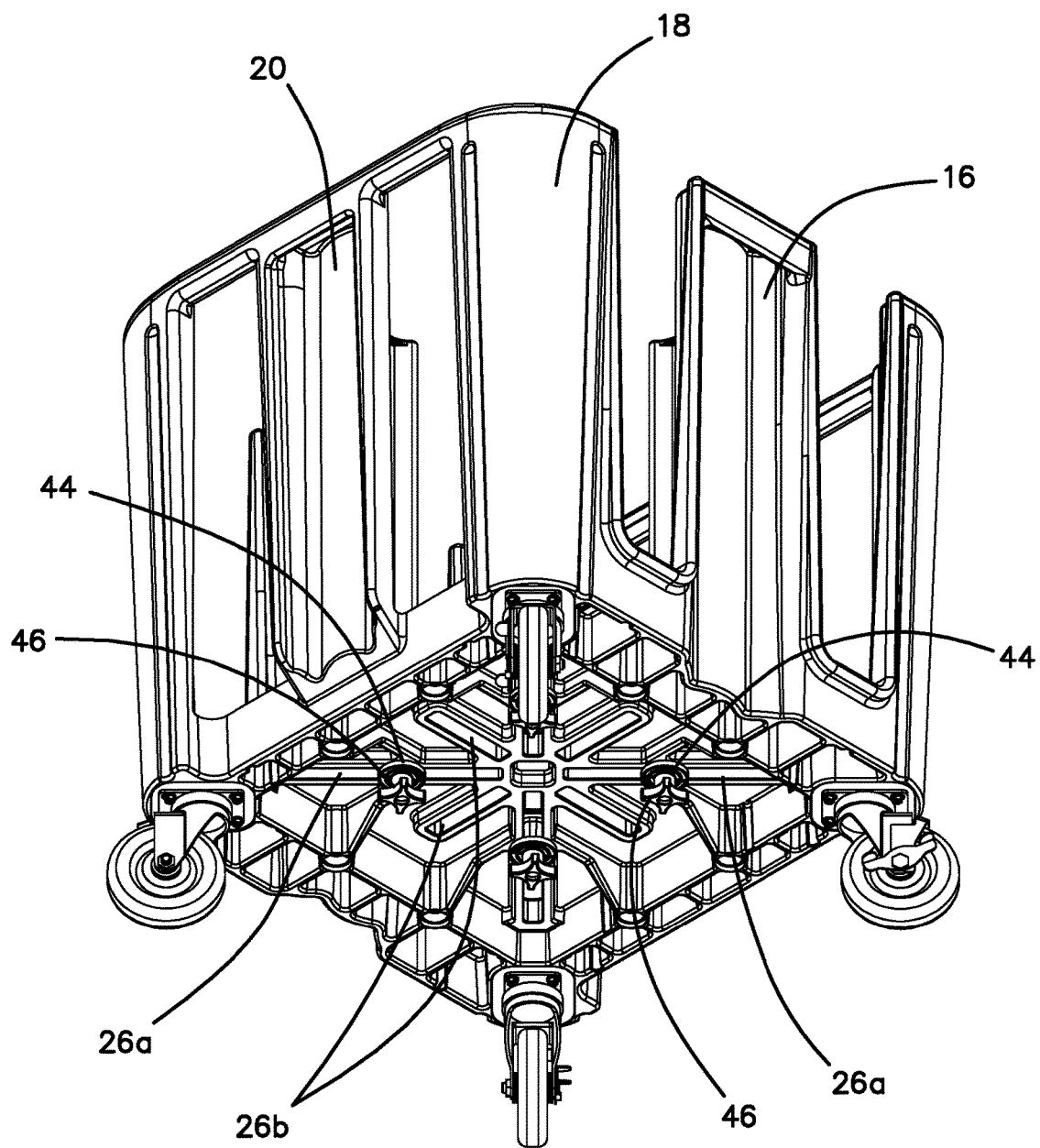
FIG. 10 is a bottom perspective view of the adjustable dish caddy seen in FIG. 1.

The user may repeat the above process and insert a plurality of partitions 24 for each of the pathways 26a, 26b until the desired configuration for the caddy 10 is achieved. For example, FIGS. 1 and 10 show when four partitions 24 have been placed or inserted into each of the four corner orientated pathways 26a so as to stack or store a plurality of dishes or dishware between the partitions 24 and the corner posts 18.

Alternatively, each of the partitions may be inserted or placed into the four wall orientated pathways 26b so as to stack or store a plurality of glasses, cups, or other dishware between the partitions 24 and the center posts 20. In either case, the concave shape of the curved frontal surface 32 of the partition 24 accommodates the corresponding rounded shape of any dish or glass in a substantially nested configuration. In a further embodiment, the plurality of partitions 24 may be inserted or placed into a combination of both corner orientated pathways 26a and wall orientated pathways 26b as selected by the user.

Figure 11A:
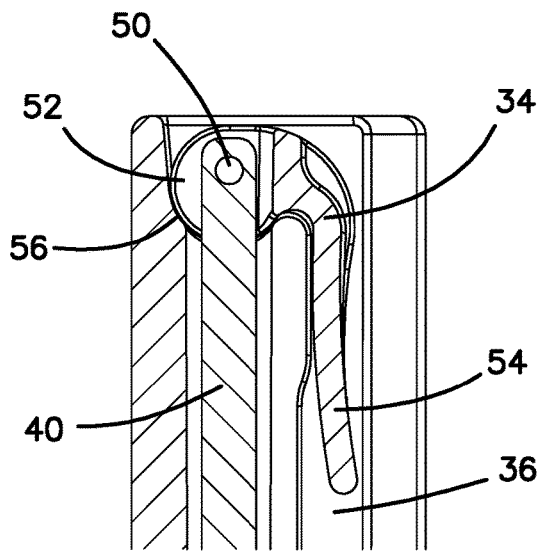
FIG. 11A is a magnified cross sectional view of the cam lever shown in FIGS. 7 and 8A, as used to lower and raise the cam shaft of the adjustable dish caddy when the cam lever is in the locked configuration.
Figure 11B:
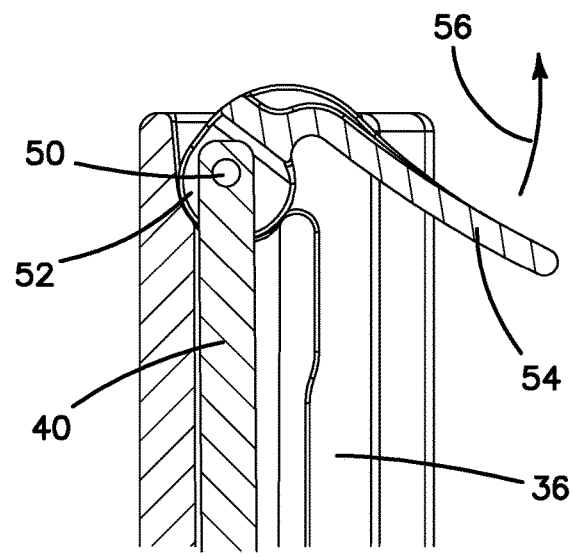
FIG. 11B is a magnified cross sectional view of the cam lever shown in FIGS. 7 and 8A, as used to lower and raise the cam shaft of the adjustable dish caddy while the cam lever is being actuated.
Figure 11C:
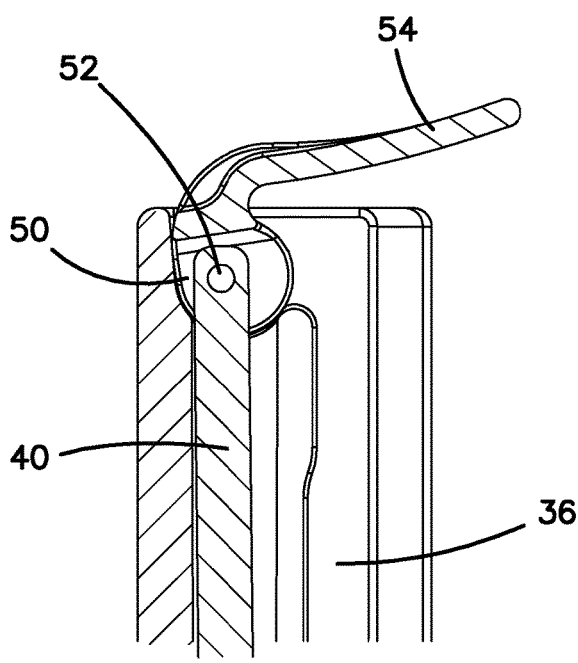
FIG. 11C is a magnified cross sectional view of the cam lever shown in FIGS. 7 and 8A, used to lower and raise the cam shaft of the adjustable dish caddy when the cam lever is in the open configuration.

To adjust the relative position of the partition 24 within its respective pathway 26a, 26b, the user places a finger within the finger recess 36 and rotates the cam lever 34 upwards away from the surface of the body 30 as depicted in FIGS. 11A-11C. Specifically, as seen in FIG. 11A, when the cam lever 34 is in the locked position, the body 52 of the cam lever 34 rests in a corresponding or mirror image shaped inner cam seat 56. The cam shaft 40 is coupled to the body 52 of the cam lever 34 at a junction point 50. As also seen in FIG. 11A, a distal portion 54 of the cam lever 34 rests in a substantially vertical position within the finger recess 36. The user inserts a finger in between the distal portion 54 of the cam lever 34 and the surface of the finger recess 36 and lifts or rotates the cam lever 34 in the counterclockwise direction of arrow 56. Rotating the cam lever 34 in the counterclockwise direction rotates the body 52 of the cam lever 56 within the cam seat 56 which lowers or otherwise pushes the cam shaft 40 in the downward direction through the body 30 of the partition 24.

Figure 12A:
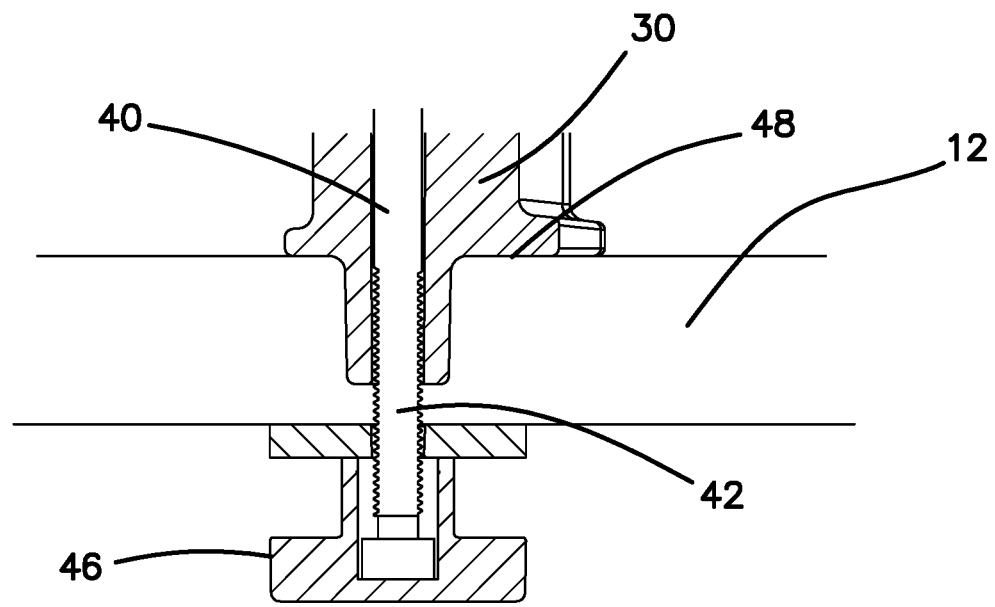
FIG. 12A is a magnified cross sectional view of the adjustable knob shown in FIGS. 7 and 8B, used to lock the partition to the base of the adjustable dish caddy when the adjustable knob is in the locked configuration.

When the cam lever 34 is in the locked position, the spacer 44 and adjustable knob 46 are initially against the base 12 of the caddy 10 as seen in the cross sectional view of FIG. 12A. When the cam lever 34 is rotated upward, the spacer 44 and the adjustable knob 46 are responsively moved away from the bottom surface of the base 12 as seen in FIG. 12. The cam lever 34 is continually rotated in the counterclockwise direction until its maximum rotated or unlocked position is achieved as seen in FIG. 11C.

Figure 12B:
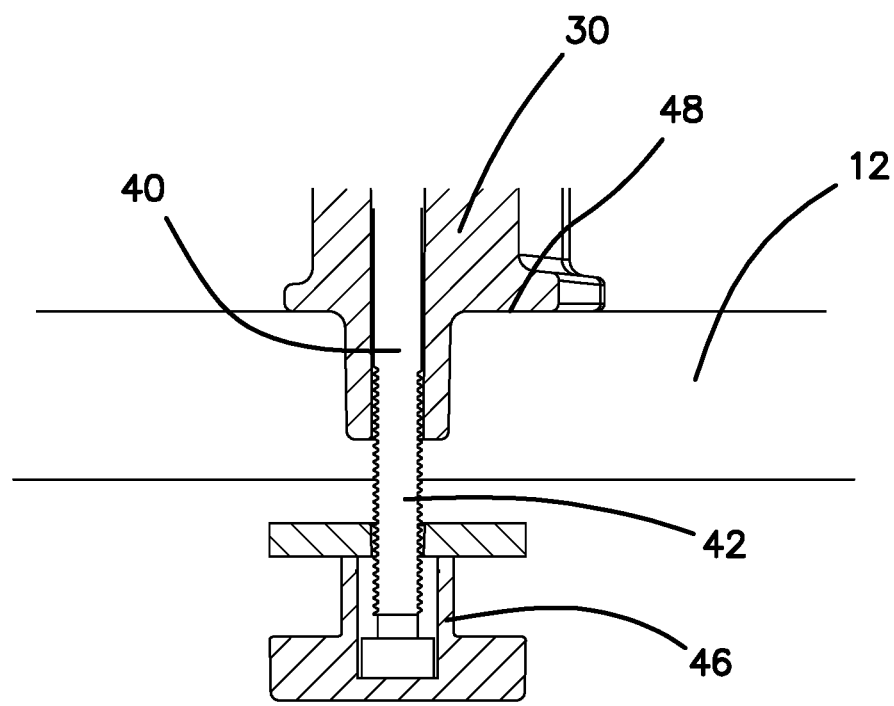
FIG. 12B is a magnified cross sectional view of the adjustable knob used to lock the partition to the base of the current invention when the adjustable knob is in the open configuration.

With the spacer 44 and adjustable knob 46 moved off the bottom surface of the base 12 seen in FIG. 12B, the base 12 is no longer sandwiched between the spacer 44 and the bottom surface 48 of the body 30 and the partition 24 is free to move along the length of the pathway 26a, 26b in which it is disposed. The user can then move or slide the partition 24 to a new desired position along the pathway or channel 26a, 26b. By releasing the partition 24 the bottom surface 48 rests against the top surface of the base 12. The user then rotates or pushes the cam lever 34 back in the clockwise direction until the cam lever 34 is returned to the finger recess 36 as seen in FIG. 11A.

The downward rotation of the cam lever 34 brings or lifts the cam shaft 40 back upward through the body 30 of the partition 24 which reestablishes contact between the base 12 and the spacer 44 disposed on the distal portion of the cam shaft 40. The partition 24 is locked into its new position as shown in FIG. 12A. By unlocking and locking the partition 24 to the base 12 using the cam lever 34, the user may be repeatedly move the partition 24 anywhere within the pathway 26a, 26b as needed to accommodate a variety of differently sized dishware without having to excessively bend over or invert the caddy 10 beforehand.

A particular feature of this invention is that the cam lever 34 when locked resides completely within the finger recess 36 as shown in FIG. 11A. This allows placement and removal of dishware without contacting the cam lever 34.

To remove a partition 24 completely from the caddy 10, the user must flip or turn over the entire caddy 10 so that the bottom surface of the base 12 and the plurality of adjustable knobs 46 for each partition 24 are exposed. The user may then manipulate each of the adjustable knobs 46 and remove them from each respective threaded portion 42 of the cam shaft 40. Once the adjustable knob 46 is removed, the spacer 44 may be slid from the end of the cam shaft 40 thereby freeing the partition 24 from the base 12. The user may turn over or return the caddy 10 to the upright position seen in FIG. 1 and remove each partition 24 by lifting the partition 24 out of the pathway 26a, 26b it was disposed in. Both the caddy 10 and the partitions 24 may then be washed or stored separately for later use. The partitions 24 may then be recoupled to the base 12 of the caddy 10 at any time following the same procedure disclosed above.

Figure 13A:
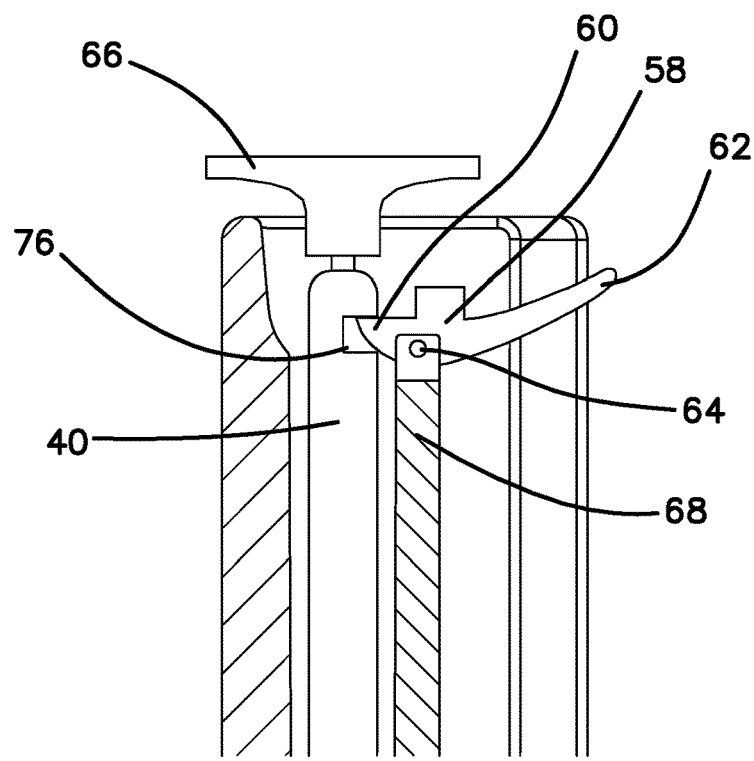
FIG. 13A is a magnified cross sectional view of an alternative embodiment a locking lever of the adjustable dish caddy comprising a pull handle and a latch when the latch and cam shaft are in the locked configuration.
Figure 13B:
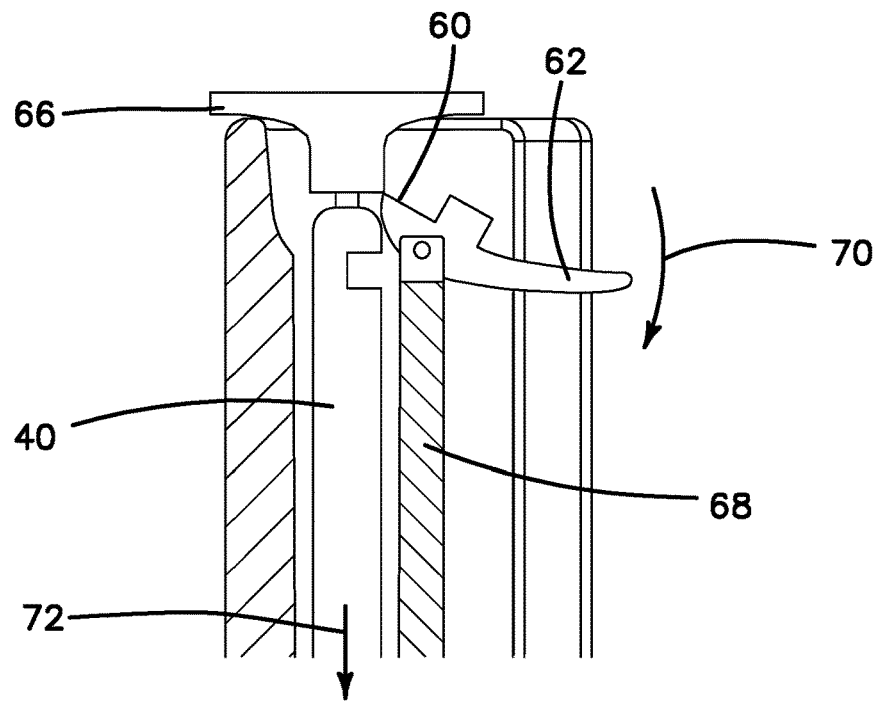
FIG. 13B is a magnified cross sectional view of the alternative embodiment seen in FIG. 13A comprising a pull handle and a latch when the latch and cam shaft are in the locked configuration.
Figure 14A:
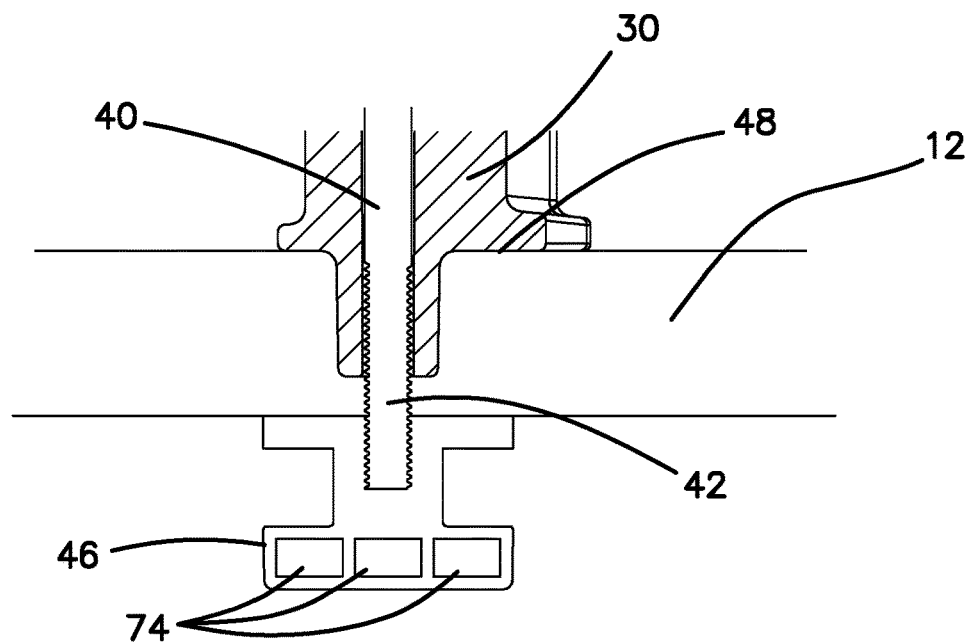
FIG. 14A is a magnified cross sectional view of an alternative embodiment of the adjustable knob comprising a plurality of weighted elements when the adjustable knob is in the locked configuration.
Figure 14B:
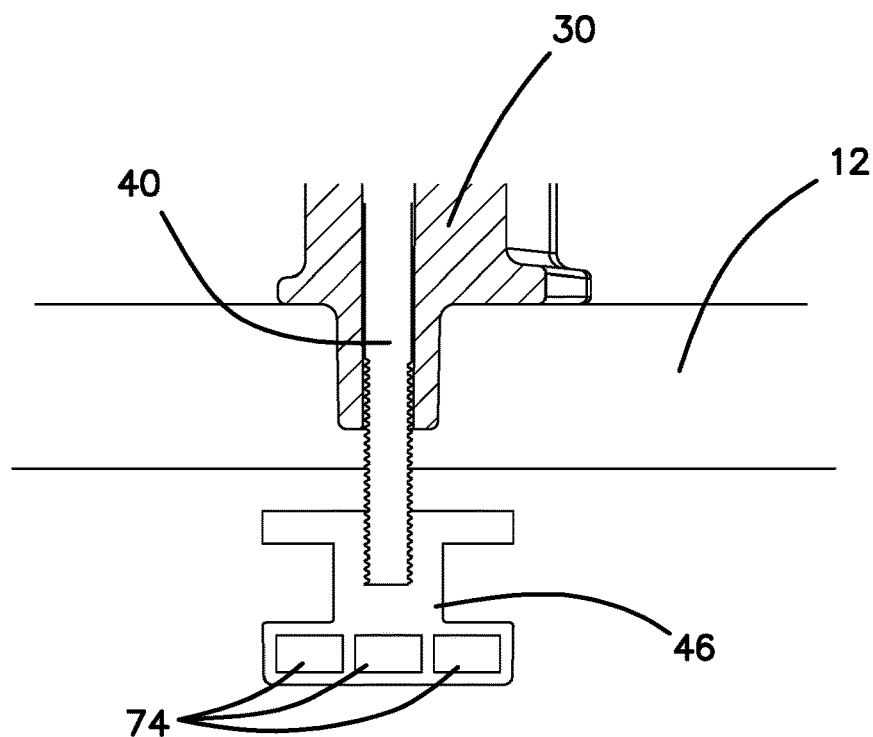
FIG. 14B is a magnified cross sectional view of the alternative embodiment seen in FIG. 14A when the adjustable knob is in the open configuration.

In an alternative embodiment, the relative position of the partition 24 within its respective pathway 26a, 26b may be adjusted through the manipulation of a latch 58 and pull handle 66 as seen in FIGS. 13A and 13B. In this particular embodiment, a latch 58 comprising a thumb tab 62 at its proximal end and a wedge 60 disposed at its distal end is disposed on a top or upper portion of an inner seat 68. The latch 58 is coupled to the inner seat 68 through a junction point 64 which is a pin disposed through the latch 58, thus allowing the latch 58 to rotate about the junction point 64. Also in this embodiment, the cam shaft 40 comprises a notch 76 defined in its upper portion, the notch 76 specifically being substantially shaped or contoured to fit or accommodate the wedge 60 portion of the latch 58. Coupled to the top of the cam shaft 40 is a pull handle 66 which is substantially shaped to accommodate one or more fingers of a user when the user grips the pull handle 66. As seen in FIGS. 14A and 14B, this embodiment also comprises wherein the adjustable knob 46 comprises a plurality of weights or weighted segments 74 disposed within the body or structure of the knob 46 itself.

Returning to FIGS. 13A and 13B, when the partition 24 is in the locked position, the wedge 60 portion of the latch 58 rests within the defined notch 76. To move the partition 24 to the unlocked position, the user presses down on the thumb tab 62 portion of the latch 58, thus rotating the latch 58 in the clockwise direction shown by arrow 70. Rotating the latch 58 in the clockwise direction in turn moves or pulls the wedge 60 portion of the latch 58 out from the notch 76 defined within the cam shaft 40, thereby freeing the cam shaft 40 and allowing it to fall or drop under the influence of gravity in the downward direction shown by arrow 72 through the body 30 of the partition 24.

When the partition 24 is in the locked position, the spacer 44 and adjustable knob 46 are initially against the base 12 of the caddy 10 as seen in the cross sectional view of FIG. 14A. When the latch 58 is released from the notch 76 defined in the cam shaft 40, the cam shaft 40 along with the spacer 44 and adjustable knob 46 are allowed to fall away from the bottom surface of the base 12 as seen in FIG. 14B. As also seen in FIGS. 14A and 14B, the adjustable knob 46 may also comprise one or more weights or weighted segments 74. The weights 74 may be comprised of dense solid material such as suitable metal or metal alloys known in the art which substantially increase the overall weight of the knob 46 coupled to the threaded portion 42 of the cam shaft 40. Increasing the weight of the knob 46 ensures that the cam shaft 40 rapidly and reliably falls through the body 30 of the partition 24 when it is released by the latch 58.

With the spacer 44 and adjustable knob 46 moved off the bottom surface of the base 12 seen in FIG. 14B, the base 12 is no longer sandwiched between the spacer 44 and the bottom surface 48 of the body 30 and the partition 24 is free to move about the length of the pathway 26a, 26b in which it is disposed. The user then moves or slides the partition 24 to a new desired position along the pathway 26a, 26b and releases the partition 24 so that the bottom surface 48 rests against the top surface of the base 12. The user then grips the pull handle 66 disposed at the top of the cam shaft 40 and lifts upward, thereby bringing the cam shaft 40 back upwards through the body 30 and reestablishing contact between the base 12 and the spacer 44 disposed on the distal portion of the cam shaft 40. Pulling upwards on the pull handle 66 also brings the notch 76 back into position near the latch 58, thereby allowing the user to rotate the latch 58 in the counterclockwise direction and bring the wedge 60 portion back into contact with the internal surfaces of the notch 76. When the wedge 60 portion of the latch 58 is firmly within the notch 76, the cam shaft 40 is once again prevented from falling back down through the body 30 and the partition 24 is thus locked into its new position as shown in FIG. 14A. By unlocking and locking the partition 24 to the base 12 using a combination of the latch 58, notch 76, and pull handle 66, the user may be repeatedly move the partition 24 anywhere within the pathway 26a, 26b as needed and accommodate a variety of differently sized dishware without having to excessively bend over or invert the caddy 10 beforehand.

Figure 15A:
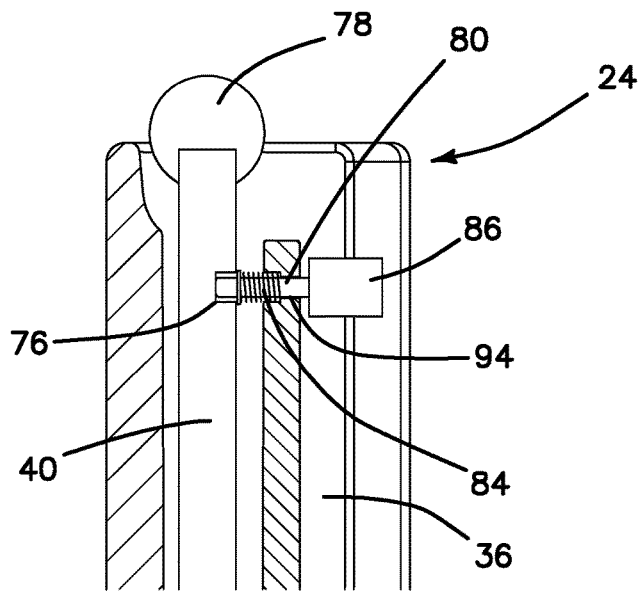
FIG. 15A is a magnified cross sectional view of an alternative embodiment of the current invention comprising a spring loaded release knob used to lower and raise the cam shaft of the current invention when the release knob is in the locked configuration.
Figure 15B:
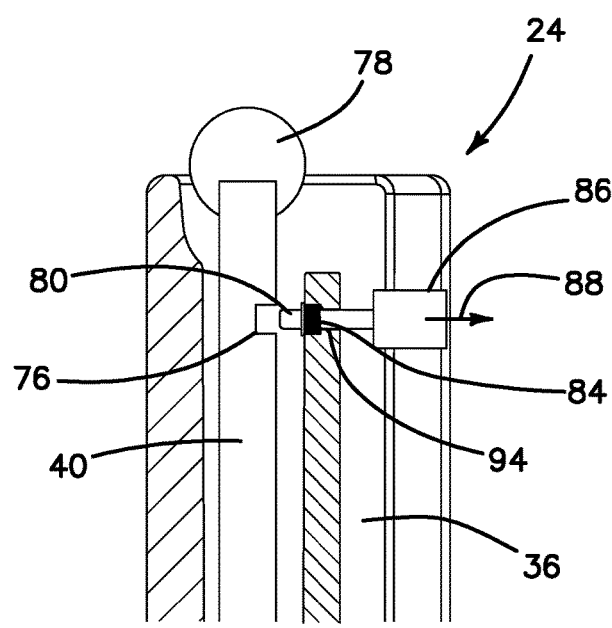
FIG. 15B is a magnified cross sectional view of the alternative embodiment seen in FIG. 15A while the release knob is being actuated.
Figure 15C:
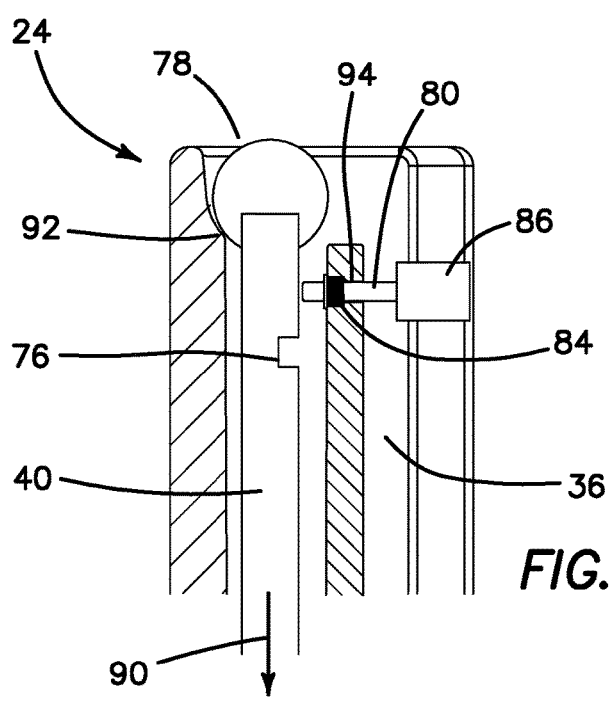
FIG. 15C is a magnified cross sectional view of the alternative embodiment seen in FIG. 15A when the release knob is in the open configuration.

In an alternative embodiment as shown in FIGS. 15A-15C, the relative position of the partition 24 within its respective pathway 26a, 26b may be adjusted through the manipulation of a release knob body 86 and a handle 78. In this particular embodiment, the release knob body 86 comprises a pin cylinder 82 that is coupled to an outside surface of a handle seat 92 at its distal end and is disposed within an internal volume of the release knob body 86 at its proximal end. The pin cylinder 80 is preferably disposed and slidably coupled at a concentric position within the release knob body 86. Specifically, the release knob body 86 is configured so as to be slidably engaged with the pin cylinder 80 so that when actuated, the release knob body 86 may slide across the longitudinal length of the pin cylinder 80 while the pin cylinder 80 itself remains in a stationary position against the finger recess 36. Defined within a portion of the handle seat 92 is a pin aperture 84 which is sufficiently shaped to accommodate the pin 80. The pin aperture 94 provides access for the pin 80 to the cam shaft 40 as it slides through the finger recess 36 portion of the partition 24. Disposed within the pin cylinder 82 and pin aperture 94 is a pin 80 which is preferably substantially cylindrical in shape and which is comprised of durable material such as metal or other suitable material. The pin 80 is coupled at one longitudinal end to an outside distal surface of the release knob body 86. Coupled between an inside distal surface of the release knob body 86 and a proximal end of the pin cylinder 80 is a spring 84. Also in this embodiment, the cam shaft 40 comprises a notch 76 defined in its upper portion, the notch 76 specifically being substantially shaped or contoured to fit or accommodate the diameter of the pin 80. Coupled to the top of the cam shaft 40 is a handle 78 which is substantially spherically shaped so as to provide a sufficient surface for the user to grip.

When the partition 24 is in the locked position, the spring 84 is in the extended or expanded position which maintains the pin 80 within the defined notch 76 of the cam shaft 40. To move the partition 24 to the unlocked position, the user pulls on the release knob body 86 in the direction normal to the partition 24 represented by arrow 88 shown in FIG. 15B. Pulling the release knob body 86 in the direction shown moves it along the length of the pin cylinder 80 and brings the distal surface of the release knob body 86 towards the proximal end of the pin cylinder 82, thereby compressing the spring 84 disposed there between. Pulling the release knob body 86 also pulls the pin 80 in the distal direction away and out of the notch 76 defined in the cam shaft 40 as seen in FIG. 15B and back into or through the pin aperture 94. With the pin 80 removed from the notch 76 of the cam shaft 40, the cam shaft 40 is free to fall in the direction shown by arrow 90 in FIG. 15C. The cam shaft 40 continues to fall downward through the body 30 of the partition 24 until a bottom portion of the handle 78 comes into contact and rests against the handle seat 92. At any point the user may disengage the release knob 86, thus allowing the spring 84 to expand and push the pin 80 back in the distal direction through the pin cylinder 82 and pin aperture 84. As with the previous embodiment, the downward movement of the cam shaft 40 in turn moves the spacer 44 and adjustable knob off of the bottom surface of the base 12. Specifically, when the partition 24 is in the locked position, the spacer 44 and adjustable knob 46 are initially against the base 12 of the caddy 10 as seen in the cross sectional view of FIG. 14A. When the pin 80 is pulled back or away from the notch 76 defined in the cam shaft 40, the cam shaft 40 along with the spacer 44 and adjustable knob 46 are allowed to fall away from the bottom surface of the base 12 as seen in FIG. 14B, for example.

With the spacer 44 and adjustable knob 46 moved off the bottom surface of the base 12, seen for example in FIG. 14B, the base 12 is no longer sandwiched between the spacer 44 and the bottom surface 48 of the body 30 and the partition 24 is free to move about the length of the pathway 26a, 26b in which it is disposed. The user then moves or slides the partition 24 to a new desired position along the pathway 26a, 26b and releases the partition 24 so that the bottom surface 48 rests against the top surface of the base 12. The user then grips the handle 78 disposed at the top of the cam shaft 40 and lifts upward, thereby bringing the cam shaft 40 back upwards through the body 30 and reestablishing contact between the base 12 and the spacer 44 disposed on the distal portion of the cam shaft 40.

As shown in FIGS. 15A-15C, pulling upwards on the handle 78 also brings the notch 76 back into position near the opening of the pin aperture 94, thereby allowing the user to disengage the release knob body 86 which releases the spring 94 and drives the pin 80 in the distal direction through the pin aperture 84 and into the notch 76. Alternatively, the user may not manipulate the release knob body 86 at all and instead simply lift the handle 78 upward until the notch 76 once again comes into alignment with the pin aperture 94 thereby allowing additional space for the spring 84 to expand and thus "automatically" move the pin 80 distally into the now aligned notch 76 of the cam shaft 40. Either way, when the spring 84 is in the fully extended configuration, the pin 80 is firmly seated or placed within the notch 76 and the cam shaft 40 is once again prevented from falling back down through the body 30. The partition 24 is thus locked into its new position as shown in FIG. 15A. By unlocking and locking the partition 24 to the base 12 using a combination of the release knob body 86, the pin 80, and the handle 78, the user may repeatedly move the partition 24 anywhere within the pathway 26a, 26b as needed in order to accommodate a variety of differently sized dishware without having to excessively bend over or invert the caddy 10 beforehand.

Many alterations and modifications may be made by those having ordinary skill in the art without departing from the spirit and scope of the invention. Therefore, it must be understood that the illustrated embodiment has been set forth only for the purposes of example and that it should not be taken as limiting the embodiments as defined by the following embodiments and its various embodiments. For example, various eccentric cam shapes or profiles such as pear, oblong, and plate among others will be obvious to those skilled in the art and which can also be substituted for the cam shape shown. Also, while a contoured partition is shown, other partition configurations are contemplated which can be substituted such as partitions having a one or more sides which are flattened, convex, or concave or having a cross section which is round to form a cylinder or having many sides such as a hexagonal or triangular cross section in order to conform to the shape of the dishware or other items to be stored in the dishware caddy. These variations are contemplated and are considered to fall within the spirit and scope of the invention.

Therefore, it must be understood that the illustrated embodiments have been set forth only for the purposes of example and that it should not be taken as limiting the embodiments as defined by the following claims. For example, notwithstanding the fact that the elements of a claim are set forth below in a certain combination, it must be expressly understood that the embodiments include other combinations of fewer, more or different elements than those, which are disclosed above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the invention.

The words used in this specification to describe the various embodiments are to be understood not only in the sense of their commonly defined meanings, but also to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

We claim:

1. An apparatus for accommodating a plurality of dish ware items comprising:
   a base;
   a first plurality of pathways defined in the base;
   a second plurality of pathways defined in the base, the second plurality of pathways being defined at an orientation that is different than the first plurality of pathways; and
   a plurality of partitions removably inserted into either the first or second plurality of pathways,
   wherein each of the plurality of partitions comprises means for adjusting the relative position of the partition within its respective pathway disposed in a top portion of the partition.

2. The apparatus of claim 1 where the means for adjusting the relative position of the partition within its respective pathway disposed in a top portion of the partition comprises:
   a cam lever;
   a cam shaft coupled to the cam lever and disposed throughout the height of the partition, wherein the cam shaft comprises a distal threaded end and a proximal end located at a top portion of the partition, the proximal end of the cam shaft being coupled to the cam lever;
a spacer disposed on the distal threaded portion of the cam shaft; and
an adjustable knob threadably coupled to the distal threaded portion of the cam shaft.

3. The apparatus of claim 1 where the plurality of partitions removably inserted into either the first or second plurality of pathways each comprise a peg disposed on a bottom surface of the partition, the peg configured to be inserted into any of the first or second plurality of pathways.

4. The apparatus of the claim 3 where the distal threaded end of the cam shaft protrudes from the peg while the bottom surface of the partition rests on a top surface of the base when the partition is inserted to one of the plurality of first or second pathways.

5. The apparatus of claim 4 where the spacer and adjustable knob are coupled to the portion of the distal threaded end of the cam shaft which protrudes from the peg, thereby disposing the base between the bottom surface of the partition and the spacer.

6. The apparatus of claim 1 where each of the plurality of partitions comprises a body, the body comprising a curved frontal surface.

7. The apparatus of claim 6 where the cam lever is disposed in a finger recess defined within the curved frontal surface of the body of each of the plurality of partitions.

8. The apparatus of claim 1 further comprising a pair of end walls and a pair of mid-walls coupled to the base, wherein the pair of end walls and the pair of mid-walls are each disposed on a separate edge of the base.

9. The apparatus of claim 8 where each of the end walls comprises a pair of corner posts and a center post disposed between the corner posts.

10. The apparatus of claim 9 where the first plurality of pathways are defined between a center of the base and each of the corner posts of each of the end walls, and where the second plurality of pathways are defined between the center of the base and each of the pair of mid-walls and each of the pair of center posts of each of the end walls.

11. The apparatus of claim 2 where the adjustable knob threadably coupled to the distal threaded portion of the cam shaft comprises a plurality of weights.

12. The apparatus of claim 1 where the means for adjusting the relative position of the partition within its respective pathway disposed in a top portion of the partition comprises:
a latch rotatably coupled with respect to an inner seat within the partition; and
a cam shaft disposed throughout the height of the partition, wherein the cam shaft comprises a distal threaded end and a proximal end located at a top portion of the partition, the proximal end of the cam shaft comprising a pull handle,
wherein the cam shaft comprises a notch defined in its surface, the notch configured to accommodate a wedge portion of the latch.

13. The apparatus of claim 1 where the means for adjusting the relative position of the partition within its respective pathway disposed in a top portion of the partition comprises:
a release knob coupled to a handle seat within the partition, the release knob comprising a pin; and
a cam shaft disposed throughout the height of the partition, wherein the cam shaft comprises a distal threaded end and a proximal end located at a top portion of the partition, the proximal end of the cam shaft comprising a handle,
wherein the cam shaft comprises a notch defined in its surface, the notch configured to accommodate the pin of the release knob.

14. The apparatus of claim 13 where the release knob comprises:
a release knob body;
a pin cylinder disposed concentrically within the release knob body and coupled to the handle seat; and
a spring disposed between at least one surface of the release knob body and at least one surface of the pin cylinder,
wherein the pin is disposed within the pin cylinder and coupled to at least surface of the release knob body, and
wherein the release knob body is slidably engaged with the pin cylinder.

15. The apparatus of claim 13 where the handle seat comprises a pin aperture defined through at least a portion of its cross sectional thickness.

16. A method for adjusting a dish caddy comprising:
removably coupling a partition to the base;
actuating a cam lever disposed in a top portion of the partition inserted into a pathway defined within the base, the base comprising a top surface and a bottom surface;
releasing the partition from a first position within the pathway;
sliding the partition along the length of the pathway from the first position to a second position; and
fixing the partition to the base at the second position within the pathway,
where coupling the partition to the base comprises:
inserting a peg disposed on a bottom surface of the partition into one of a plurality of pathways defined within the base;
exposing a distal portion of a cam shaft disposed through the height of the partition through the bottom surface of the base;
threading the distal portion of the cam shaft through a spacer; and
coupling an adjustable knob to the distal portion of the cam shaft and rotating the adjustable knob until the spacer is pressed against the bottom surface of the base.

17. The method of claim 16 where releasing the partition from a first position within the pathway comprises lowering a cam shaft through a body of the partition and backing a spacer disposed on a distal end of the cam shaft off of the bottom surface of the base.

18. The method of claim 16 where actuating a cam lever disposed in a top portion of the removable partition moves a cam shaft disposed throughout a height of a body of the partition in the downward direction relative to the body of the partition.

19. The method of claim 16 where fixing the partition to the base at the second position within the pathway comprises raising a cam shaft through a body of the partition and bringing a spacer disposed on a distal end of the cam shaft into contact with the bottom surface of the base.

20. The method of claim 16 where sliding the partition along the length of the pathway from the first position to a second position comprises sliding a peg disposed on a bottom surface of the partition within the pathway until reaching the second position.

21. The method of claim 16 further comprising removing the partition from the base, where removing the partition from the base comprises:

rotating the adjustable knob until the spacer backs off from the bottom surface of the base and removing the adjustable knob from the distal portion of the cam shaft;

removing the spacer from the distal portion of the cam shaft; and lifting the partition upward away from the top surface of the base and removing the peg disposed on the bottom surface of the partition from within the pathway.

22. The method of claim 16 further comprising removably coupling a plurality of partitions to the base, where the plurality of partitions are inserted into a corresponding plurality of pathways defined within the base.

23. The method of claim 22 where inserting the plurality of partitions into the corresponding plurality of pathways comprises inserting the plurality of partitions into a plurality of pathways which are defined between a center of the base and a corresponding plurality of corner posts disposed on the base.

24. The method of claim 22 where inserting the plurality of partitions into the corresponding plurality of pathways comprises inserting the plurality of partitions into a corresponding plurality of pathways which are defined between a center of the base and a pair of mid-walls disposed on the base and a pair of center posts disposed on the base.

25. An apparatus for accommodating a plurality of dishware items comprising:
   a base;
   at least one pathway defined in said base;
   at least one partition removably inserted into said at least one pathway; and
   cam means disposed within said at least one partition for moving, adjusting and securing the relative position of said partition at a desired position within its respective pathway, said means being disposed in a portion of said partition extending above said base,
   wherein said means for adjusting and securing the relative position of said at least one partition within its respective pathway comprises:
      a cam;
      a lever attached to said cam;
      a cam shaft coupled to said cam lever and disposed through the height of said partition, said distal end of said cam shaft adapted for insertion into said pathway within said base; and
      means for securing said distal end of said cam shaft beneath said base.

26. An apparatus as claimed in claim 25 wherein said distal end of said cam shaft is threaded, and further comprising:
   a spacer disposed on said distal threaded portion of said cam shaft; and
   an adjustable knob threadably coupled to said distal threaded portion of said cam shaft.

27. The apparatus of claim 26 wherein said at least one partition includes a peg disposed on a bottom surface of said partition, said peg configured to be inserted into said at least one pathway; and
   wherein said distal threaded end of said cam shaft protrudes from said peg while the bottom surface of said partition rests on a top surface of said base when said partition is inserted into said at least one pathway.

28. The apparatus of claim 27 wherein said spacer and said adjustable knob are coupled to the portion of said distal threaded end of said cam shaft which protrudes from said peg, thereby disposing said base between the bottom surface of said at least one partition and said spacer.

29. The apparatus of claim 25 wherein said at least one partition comprises a body having at least one curved vertical surface.

30. The apparatus of claim 29 further comprising:
   a finger recess disposed within said at least one curved vertical surface of said at least one partition; and
   wherein said cam lever is disposed within said finger recess.

31. The apparatus of claim 25 further comprising one or more vertical walls coupled to the sides of said base.

32. The apparatus of claim 31 wherein said one or more walls include one or more vertical openings within said walls.

33. The apparatus of claim 31 wherein said one or more walls comprises:
   one or more mid-walls coupled to said base; and
   one or more end walls coupled to said base.

* * * * *